(12) United States Patent
Kozlowski

(10) Patent No.: US 10,187,959 B2
(45) Date of Patent: Jan. 22, 2019

(54) ILLUMINATION DEVICE

(71) Applicant: Keith Allen Kozlowski, Albuquerque, NM (US)

(72) Inventor: Keith Allen Kozlowski, Albuquerque, NM (US)

( * ) Notice: Subject to any disclaimer, the term of this patent is extended or adjusted under 35 U.S.C. 154(b) by 0 days.

(21) Appl. No.: 15/588,659

(22) Filed: May 7, 2017

(65) Prior Publication Data

US 2017/0339767 A1 Nov. 23, 2017

Related U.S. Application Data

(60) Provisional application No. 62/338,511, filed on May 19, 2016.

(51) Int. Cl.
| | | |
|---|---|---|
| *H05B 37/02* | (2006.01) | |
| *F21V 23/04* | (2006.01) | |
| *F21L 4/00* | (2006.01) | |
| *F21Y 115/10* | (2016.01) | |

(52) U.S. Cl.
CPC ..... *H05B 37/0227* (2013.01); *F21V 23/0414* (2013.01); *F21V 23/0492* (2013.01); *F21L 4/005* (2013.01); *F21Y 2115/10* (2016.08)

(58) Field of Classification Search
CPC combination set(s) only.
See application file for complete search history.

(56) References Cited

U.S. PATENT DOCUMENTS

2016/0374179 A1* 12/2016 Newton ............. H05B 33/0845

* cited by examiner

*Primary Examiner* — Douglas W Owens
*Assistant Examiner* — Jianzi Chen

(57) ABSTRACT

An improved illumination device is presented which is comprised of a light emitter, a source of electric power, such as a battery, and a sensor which senses the orientation of the device. The light emitter may be a laser, conventional flashlight bulb, other illumination source, or a combination of multiple illumination sources. The sensor determines the pitch and roll state of the device, and is designed such that the light source is switched on or off depending on the specific orientation of the device.

14 Claims, 7 Drawing Sheets

ILLUMINATION DEVICE

REFERENCES CITED

U.S. Patent Documents

| | | |
|---|---|---|
| 4,152,754 | February 1977 | Carpi, Christiano |
| 5,435,091 | May 2008 | Toole et al. |
| 6,814,466 | November 2002 | Parsons, Kevin and Reeves, W. Clay |
| 7,296,358 | January 2005 | Murphy et al. |

Other Publications

| | | |
|---|---|---|
| 20140104822 | December 2013 | Rothschild, Leigh. Published US Patent Application |

BACKGROUND OF THE INVENTION

The present invention generally relates to portable illumination devices. Portable illumination devices have seen a wide variety of implementations. One common example of which is a flashlight. Other examples are the lights and/or lasers used to provide target acquisition and aiming assistance for firearms. It is well-understood that it is desirous to provide a means to control the operation of the light in a non-continuous manner. For example, Parsons and Reeves disclose a system to control when a flashlight will operate in a continuous versus intermittent manner. Toole et al. disclose a means to momentarily operate an aiming laser for a firearm by inclusion of a momentary switch in the handgrip portion of the weapon.

A chief disadvantage of these examples is that in certain stressful situations, a person may have difficulty operating the momentary switches such systems employ. For example, if a homeowner were investigating an unusual noise in their home, the stressfulness of the situation may cause their fingers or hand to tremble. This would result in unpredictable activation of the light emitter when using momentary switches. It is not advisable in some situations to operate the light emitter in continuous mode. If there were an intruder present, operation of the device in a continuous manner could reveal the location of the homeowner to the intruder, which presents an unsafe condition.

A further disadvantage of the presented examples, in each case, the operator must maintain their grip in the exact location of the momentary switch. In the case of the device disclosed by Toole et al., the switch location may hinder use of the illumination switch in an ambidextrous fashion. The flashlight of Parsons and Reeves could not be used in the intermittent mode if the flashlight needed to be gripped away from the area of the switch. Also, if the operator were to have a condition resulting in reduced dexterity, operation of momentary switches may be difficult.

SUMMARY OF TEE INVENTION

The present invention is directed towards an illumination device which comprises one or more light emitter(s); a source of electrical power, an orientation sensor to determine the acceleration, pitch angle and/or roll angle of the device (along any one axis or multiple axes); a control circuit connected to the orientation sensor and light emitter; a logic network which provides for comparison of the orientation sensor to some number of logic conditions ($\theta_1$, $\theta_2$ ... etc.), for example comparison of the measurement of the acceleration, pitch angle and/or roll angle to reference constants, $C_1$, $C_2$ ... etc.; and means for the control circuit to alter the on or off status of the light emitter depending on the comparison of the orientation sensor to the logic conditions.

BRIEF DESCRIPTION OF THE DRAWINGS

The description herein makes reference to the accompanying drawings wherein like reference numerals refer to like parts throughout the several views, and wherein.

DETAILED DESCRIPTION OF THE INVENTION AND PREFERRED EMBODIMENTS

Figure 1:
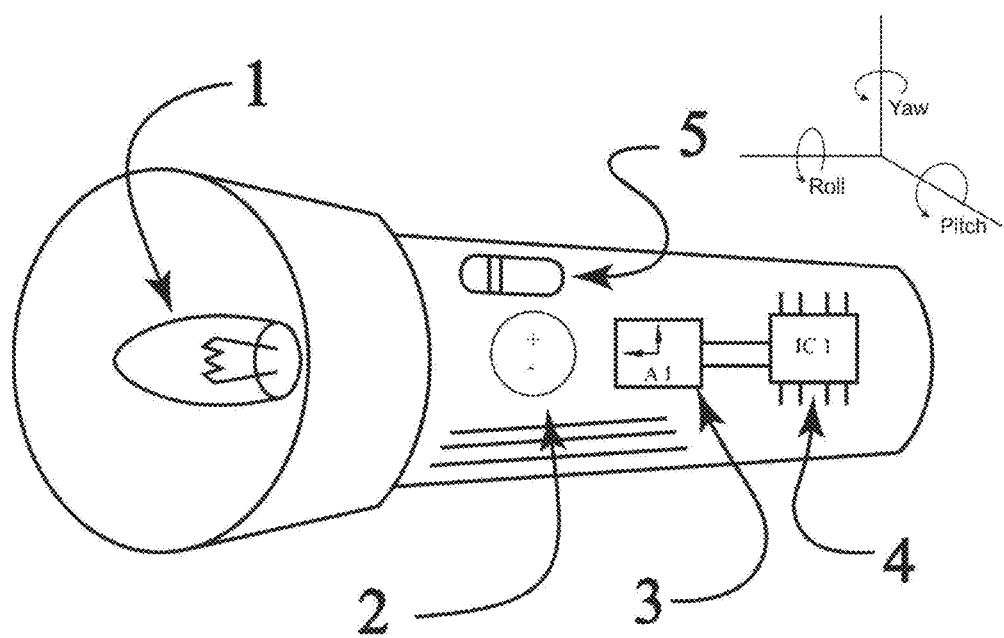
FIG. 1 is a schematic of one embodiment of the present invention, in the form intended to be carried in a hand.

Referring to FIG. 1, the present illumination device comprises at least one light emitter 1, at least one source of electrical energy 2, at least one orientation sensor 3 which is comprised of the ability to measure orientation and/or linear acceleration on at least one axis, and at least one control circuit 4. It is understood that each of these parts are described in a simplified form, and may include additional circuitry as needed for a particular purpose.

Also shown in FIG. 1 is an optional switch 5 which may be configured to connect the source of electrical energy to the light emitter, the orientation sensor, and/or control circuit, or may be configured as a multi-position switch with different modes of operation of the illumination device depending on the position of the switch. It is noted that the electrical connections are not shown in FIG. 1 and FIG. 2 as these are detailed in later figures. Further, the embodiment of the present invention shown in FIG. 1 is in a shape similar to flashlights in common usage.

Figure 5:
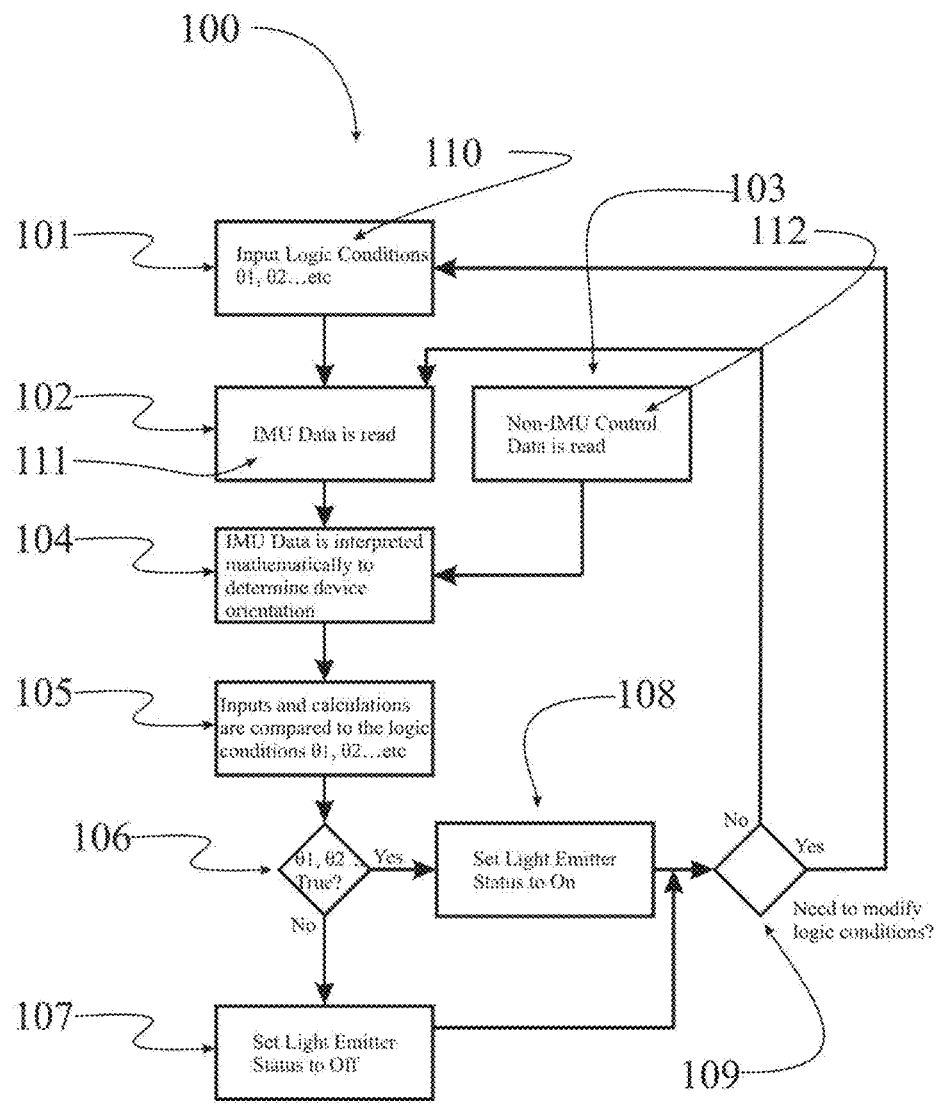
FIG. 5 is a simplified flow diagram illustrating an embodiment of the logic conditions and logic network.

The present illumination device also comprises at least one logic network 100 and at least one logic condition 110, which are not shown in FIG. 1, but are further expanded upon in the logic diagram of FIG. 5. The present invention is further comprised of the comparison of orientation measurement(s) performed by the at least one orientation sensor 3 to the at least one logic condition 110, and the results of this comparison are used by the logic network 100 in conjunction with the at least one control circuit 4 to set the status of the light emitter to on or off, as will be detailed more fully in later paragraphs.

Also shown in FIG. 1 is a coordinate system, defining rotations which are referred to as pitch, roll and yaw, using the usual definitions of these rotation terms. It is noted that the switch 5 is shown as a single switch, but the implementation may be comprised of two or more switches.

Figure 2:
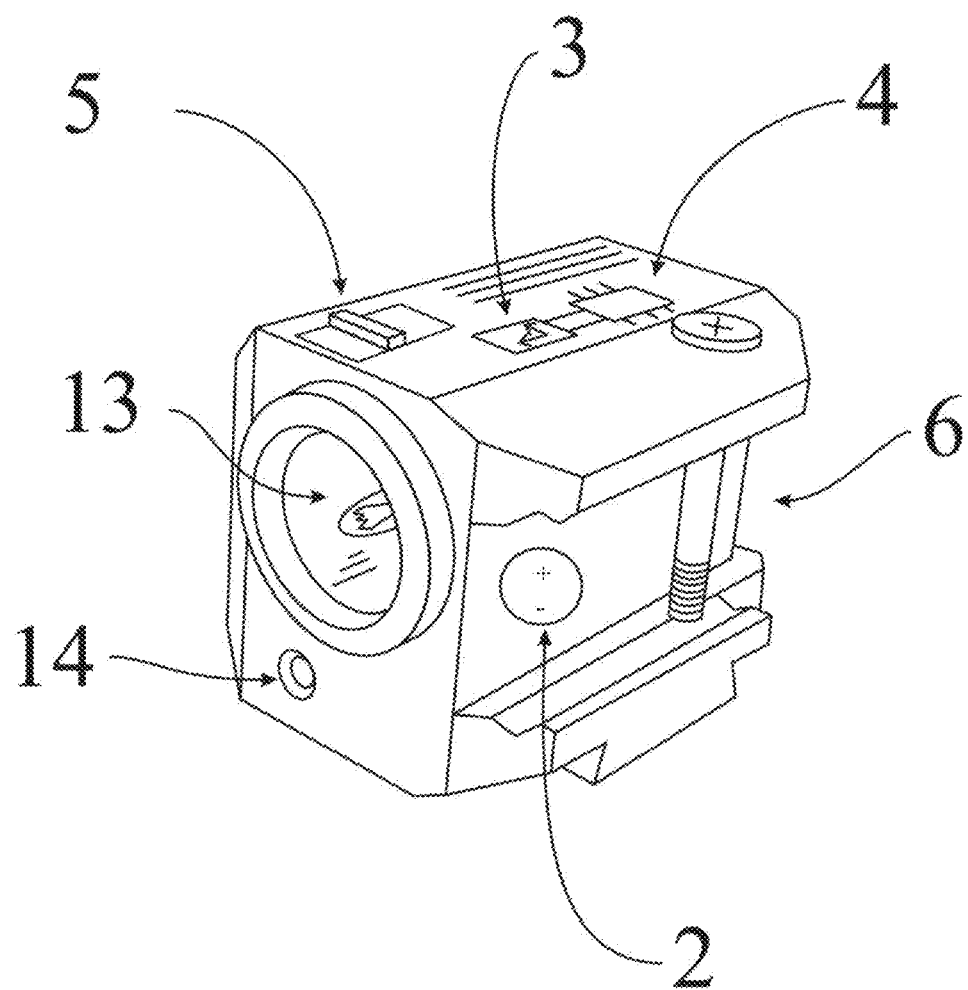
FIG. 2 is a schematic of a second embodiment of the present invention, where the light emitter is comprised of two distinct sources, and in a form intended to be fixed to a firearm, helmet, or other object with a standard mounting rail.

Referring to FIG. 2, an embodiment of the present invention is shown where the at least one light emitter 1 is comprised of a first light emitter 13 and a second light emitter 14. The first light emitter 13 in the preferred embodiment is a broad-beamed, visible spectrum light source, such as an incandescent bulb, LED, or other visible spectrum source. The second light emitter 14 in the preferred embodiment is a directional light source, such as a laser. However, it is noted that specific embodiments may result in any number or variety of light emitters, such as masers, arc lamps, electric sparks, electrical gas-discharge lamps, magnetic induction lamps, or any other illumination source, whether visible spectrum or non-visible, as may be preferable to suit a particular purpose. Further, FIG. 2 shows the present devices configured to be mounted on a firearm, helmet, or other device using a mounting rail of the type commonly used in military-style equipment (for example, MIL-STD-1913 rail), and thus is shown including a standard rail mount 6.

In the embodiments where the at least one light emitter 1 is comprised of 2 or more light emitters, and the at least one logic condition 110 is comprised oft or more logic conditions, it is noted that any of the light emitters 1 may be configured to be responsive to any of the said logic conditions, including all of the said logic conditions, none of the said logic conditions, or various subset(s) of the said logic conditions. In the case where some of the light emitters are responsive to none of the logic conditions, it is understood within the context of the present invention that at least one light emitter 1 must be responsive to at least one logic condition 110. It is noted in this context that "responsive to" is comprised that the on or off status of the at least one light emitter 1 is regulated through the control circuit 4 utilizing the logic network 100 as a basis for comparison of the output of the at least one rotational sensor 3 to at least one of the logic conditions 110.

Figure 3:
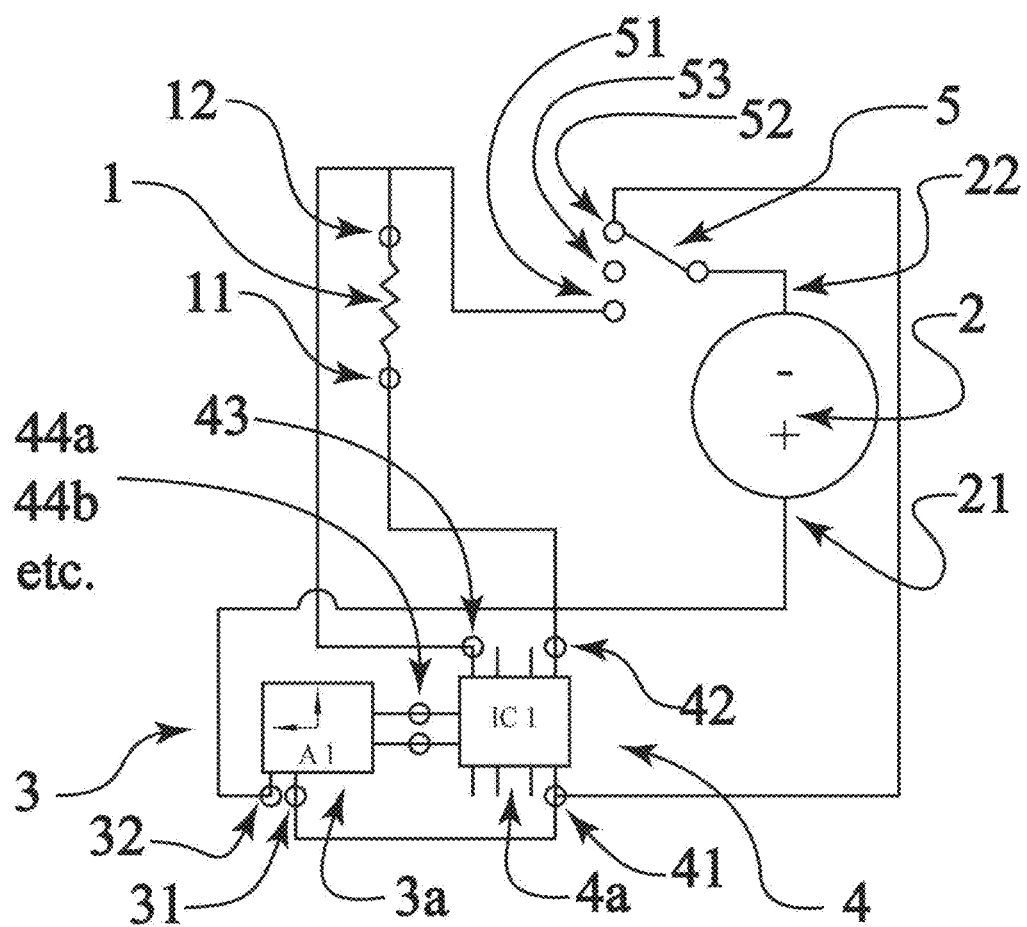
FIG. 3 is an electrical diagram, showing an embodiment of the present invention, with the addition of an optional power control switch, and with the control circuit represented by a microcontroller, where the switching of the light emitter is effected by switches integrated within the preferred microcontroller.

Referring to FIG. 3, an electrical schematic is presented of a preferred embodiment of the present invention. In this embodiment, the at least one source of electrical energy 2 is shown as a DC source, such as a battery, with a positive terminal 21 and a negative terminal 22. An optional switch 5 is shown to control operation of the device, which in the present embodiment comprises three terminals, 51, 52 and 53. The orientation sensor 3 is shown as a commercially available Microelectromechanical (MEMS) based inertial measurement unit (IMU 3a), with a terminal 31 connected to the switch 5 at a terminal 52; and a terminal 32 connected to the positive terminal 21 of the source of electrical energy 2. The IMU 3a may be comprised of one or multiple channels, with the most typical examples including three orthogonal accelerometers and/or three orthogonal gyroscopes. In this way the IMU 3a can provide precise measurement of the acceleration and orientation (pitch, roll and yaw). The control circuit 4 is represented by a programmable microcontroller 4a, with the microcontroller 4a programmed to interpret the output of the IMU 3a. The microcontroller 4a is shown with a terminal 41 connected to the switch 5 at a terminal 52; and a terminal 42 connected to the positive terminal 21 of the source of electrical energy 2. The IMU 3a and microcontroller 4a are connected to each other electrically at a number of terminals, 44a, 44b, etc., with the exact number of connections dependent upon the nature of the IMU 3a and the programming of the logic network 100. The at least one light emitter 1 is shown connected at a first terminal 11 to the positive terminal 21 of the at least one source of electrical energy 2, and connected at a second terminal 12 to a first terminal 51 of the optional switch 5. Further, the first terminal 11 is also connected to a control terminal 43 of the microcontroller 4a. It is recognized that the electrical diagram shown in FIG. 3 is an example, and many other configurations are equivalent in function, though different in specific connections, such as changing polarity of the at least one source of electrical energy 2, relocating the at least one switch 5, including other circuitry to manage voltage and or current to the at least one light emitter 1, or other modifications within the normal practice of circuit design as may be necessary for a specific purpose.

As may be seen in this embodiment, the switch 5 controls the operation mode of the at least one light emitter 1. When the switch 5 is moved to terminal 51, the light emitter 1 is connected directly to the source of electrical energy 2, and thus would illuminate regardless of the logic network 100 in the microcontroller 4a ("on state"); and therefore the electrical schematic may be designed such that in this on state, the IMU 3a and microcontroller 4a are not electrically connected to the source of electrical energy 2 since, in this on state, they are not necessary. When the switch 5 is moved to terminal 53, the source of electrical energy 2 is in an open circuit state, and thus the light emitter 1 will remain off regardless of the logic network 100 in the microcontroller 4a (off state). It is noted that, for this embodiment, in the off state, the IMU 3a and microcontroller 4a are likewise not connected to the source of electrical energy 2. However, it is not a necessary condition for the present invention to be so configured.

When the switch 5 is moved to terminal 52, the device enters into "motion controlled state", wherein the on or off status of the light emitter is controlled by the microcontroller 4a, as determined by the logic network 100 and logic conditions 110. It is noted that "on state" and "off state" refer to conditions where the at least one light emitter 1 is respectively connected or disconnected to the source of electrical energy 2 without regard to conditions determined by the microcontroller 4a, the orientation sensor 3, etc; while "on status" and "off status" refer to conditions where the at least one light emitter 1 is respectively connected or disconnected to the source of electrical energy 2 whilst controlled by the microcontroller 4a, the orientation sensor 3, etc. In addition, for both the on state and on status, it is within the scope of embodiments of this invention for the at least light emitter 1 to include additional circuitry, for example causing the at least one light emitter 1 to flash, as opposed to being operated continuously. For the purposes of the present invention, such circuitry is considered part of the light emitter, and is incorporated in further discussion by reference here.

Figure 4:
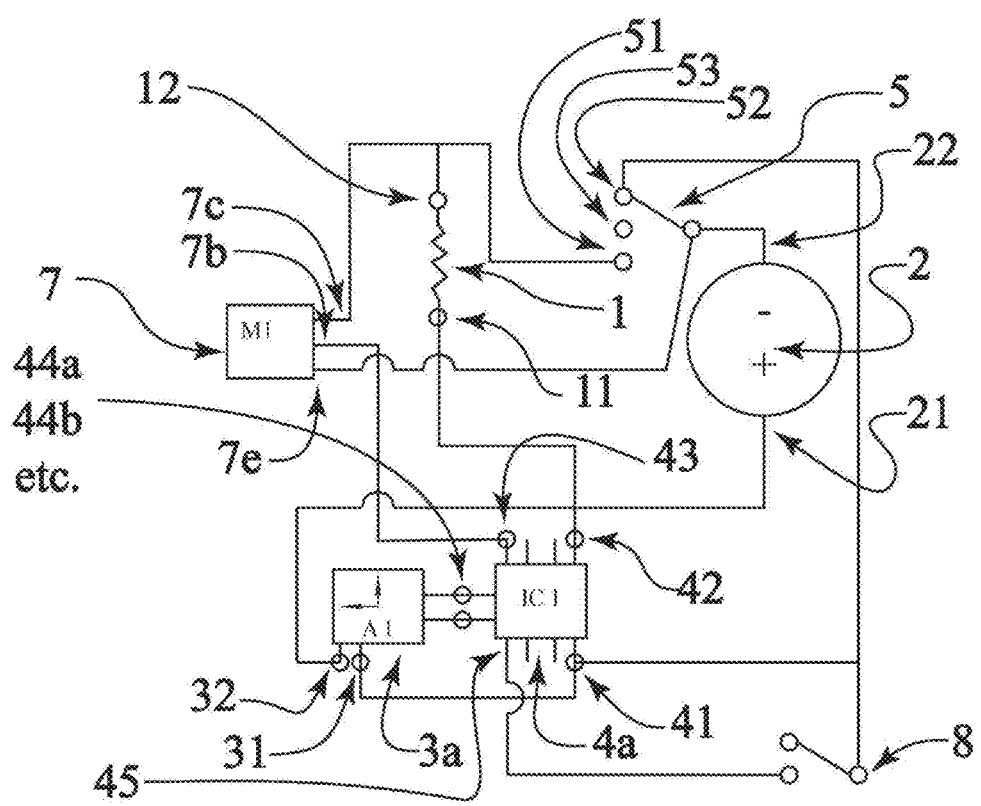
FIG. 4 is an electrical diagram, showing an embodiment of the present invention, with the addition of an optional power control switch, and with the control circuit represented by a microcontroller, where the switching of the light emitter is effected by means of a secondary circuit. In the example embodiment, this secondary circuit is comprised of a transistor, for example a metal-oxide-semiconductor field-effect transistor (MOSFET) to allow the usage of light emitters which exceed the power handling ability of the integrated switches in the microcontroller. In addition, an optional secondary switch is shown which may be used to provide an input to the control circuit.

Referring to FIG. 4, the electrical diagram has been modified to include a transistor 7, which comprises a base terminal 7b, a collector terminal 7c and an emitter terminal 7e. The transistor 7 may be any of a similar type, such as a MOSFET, Darlington transistor, etc. The at least one light emitter terminal 12 is connected to the collector terminal 7c, the control terminal 43 is connected to the base terminal 7b; and the emitter terminal 7e is connected to the source of electrical energy 2's negative terminal 22. In this embodiment, the microcontroller 4a controls the state of the transistor 7, which in turn provides for either a closed circuit or an open circuit between the source of electrical energy 2 and terminal 12. This indirect control over the light emitter allows the microcontroller 4a to provide control over a light emitter 1 requiring more current capacity than the microcontroller 4a's internal switching mechanisms are rated for, since transistors are available with significantly higher power ratings than those typically allowable in commercial microcontroller circuits. While the circuitry shown is one means to enable the control of high-powered light emitters, it is not presented as a limiting case, as there are many such indirect control circuits or switching circuits which may be determined by standard electrical engineering practice which may be included in the present invention to allow indirect control between the at least one control circuit 4 and the at least one light emitter 1.

Also shown in FIG. 4 is an optional at least one control switch 8, which provides an input signal to the microcontroller 4a by means of a connection at a terminal 45. The control switch 8 can then be used for a variety of purposes. For example, the control switch 8 may be configured as a momentary switch, and the logic network 100 could be made such that the light emitter is set to an on status for some set period of time after pressing the control switch 8. Another example of uses for control switch 8 is using the control switch 8 to modify the logic conditions 110. Yet another example of uses for control switch 8 is using the control switch 8 to cause the light emitter to flash instead of illuminating continuously. It is noted that the optional at least one control switch 8 may be one or more switch of any type, as may be useful for a particular purpose, such as buttons, slide switches, etc.

It is noted that the electrical diagrams have been shown in FIG. 3 and FIG. 4 with a single light emitter 1, but it is recognized that similar connections would be desirous amongst multiple light emitters, for example as shown in FIG. 2, and that multiple light emitters 1 may be connected in series, or parallel, and may be controlled simultaneously by the microcontroller 4a, or may have differing control circuits (4a, 4b, etc), and/or differing logic conditions 110 ($\theta_1, \theta_2$ ... etc.) which effect the on or off status of the various light emitters. It is also noted that the circuit diagrams may differ from those shown, owing to normal design practice in electrical engineering while still keeping within the scope of the present invention, including the addition of elements (inductors, resistors, capacitors, relays, transistors, diodes, integrated circuits, etc.) as needed for a particular application or purpose.

Referring to FIG. 5, a block diagram is shown for an example embodiment of a logic network 100. The logic network 100 is shown in block diagram form, but it is understood that the actual logic network 100 may be written in a language interpretable by the control circuit 4, for example in a programming language such as C, C+, machine language, Fortran, binary, etc. It is also understood that the logic network 100 may deviate from the logic structure presented to meet the needs of some specific application, and may be made up of multiple logic networks (100a, 100b, etc.), either functioning independently, or with some dependencies between them.

In step 101, the at least one logic condition 110 are comprised as inputs ($\theta_1, \theta_2$ ... etc.). It is recognized that the number of logic condition(s) 110 will vary depending on the specific application, and may be comprised of one logic condition, or several, and the various logic conditions (110a, 110b, etc.) may be independent of one another, or may have dependencies between them.

In step 102, the control circuit 4 reads the outputs 111 of the orientation sensor 3 (represented in this preferred embodiment as an IMU 3a), while in step 103, the control circuit 4 reads other data 112, for example a time signal generated by the microcontroller 4a, status of one or more momentary switch(es) (for example, control switch 8), status of the at least light emitter 1, or other inputs as may be deemed beneficial to some specific application. It is recognized that the other data 112 read in step 103 may be none, one, or more than one source of data.

In step 104, any necessary calculations are performed using the logic conditions 110 ($\theta_1, \theta_2$ ... etc.), the orientation sensor data 111, the other data 103 to determine conditions as necessary for comparison to the logic conditions 110. An example (but not limiting case) of such a calculation may be interpreting linear accelerations from the sensor 3 in a 3-dimensional vector space to determine angular orientation.

In step 105, the data obtained in steps 102 and step 103, along with the calculated values from step 104 are compared to the logic conditions 110 ($\theta_1, \theta_2$ ... etc). Examples of these comparisons (but not limited to) in a preferred embodiment:

a) a first logic condition comparison $\theta_1$ comprised of the condition where the downward pitch angle of the device is compared to a reference value $C_1$, where a downward pitch angle less than $C_1$ results in a true conditions, while a downward pitch angle greater than $C_1$ results in a false condition being set b) a second logic condition comparison $\theta_2$ comprised of the condition where the roll angle of the device is compared to a different reference value $C_2$, where a roll angle less than $C_2$, results in a true conditions, while a roll angle greater than $C_2$ results in a false condition being set; and c) a third logic condition comparison $\theta_3$ comprised of the condition where the current time signal from the control circuit 4 is compared to a reference value $C_3$, where the reference value $C_3$ may be set to look for some time duration after some event, such as a control switch 8 being pressed, resulting in a true condition, where otherwise the comparison to logic condition $\theta_3$ may result in neither true nor false, such that the other logic conditions will solely determine the true or false condition.

d) A fourth logic condition comparison $\theta_4$ comprised of the condition where the status of a control switch 8 is read by the microcontroller 4a. The status of the control switch may be used to override the other logic conditions, or may be used to modify the other logic conditions, either permanently or temporarily. Alternatively, the control switch may be used to modify the operation of the light emitter 1, for example causing the light to intermittently flash while in the "on" status.

It is noted in these example logic comparisons, an embodiment may use some, all, or none of the presented examples, as they are provided for clarification purposes only. Other logic conditions may be construed to fit a particular purpose.

In step 106, the overall true or false state of the logic network is determined. This step may be programmed such that it requires only one true condition from step 105 to pass an overall true condition (parallel logic), or alternatively require all conditions from step 105 to be true to pass an overall true condition (series logic), or alternatively may group some logic conditions from step 105 together in series, while grouping other logic conditions from step 105 in parallel, and the various groupings may likewise be configured to each other and/or other individual logic conditions in series or parallel, depending upon the needs of a particular application. It is also understood that the present invention may comprise multiple logic networks which may be independent from one another, or dependent upon one another, as may be needed for a particular application.

If the overall true or false state of the logic network 100 is set to true, for example, the control passes to step 108, which turns the light emitter 1 status to on, while if the overall logic condition is set to false, the control passes to step 107, which turns the light emitter 1 status to off. It is understood that the choice of true or false state of the logic network 100 is arbitrary, for example an overall logic condition of true may pass control to step 107, and an overall logic condition of false may pass control to step 108. The choice of words for true versus false should not be construed as limiting the present invention.

In step 109 (an optional step if needed by the designer), the logic network 100 determines if the input logic conditions 110 ($\theta_1$, $\theta_2$ . . . etc.) need to be modified based upon the known status of the device or some other stimulus. For example, if logic condition $\theta_1$ compares the pitch angle of the device to some reference value $C_1$, the value of $C_1$ may be modified in step 109 depending on the on or off status of the light emitter 1, the output of the orientation sensor 3, the position of a control switch 8, a time delay value from some event interpreted by the control circuit 4, or other feature deemed appropriate by the designer. If step 109 determines modification are required to the logic conditions 110, the new values are input into step 101, and the process repeats. If no new values are required for the logic conditions 110, the process also repeats, but without entering new logic conditions 110 into step 101.

In one embodiment of the implementation of step 109, the device may be configured such that logic conditions 110 ($\theta_1$, $\theta_2$ . . . etc.) are varied depending on the current orientation angle measurement of the IMU 3a. For example, if we assume starting from the illumination status being on and the IMU 3a indicating a pitch angle relative to the ground, the control circuit 4 may be programmed such that, the first logic condition, $\theta_1$ is a comparison of the pitch angle measured by the IMU 3a to a first value, $C_1$ and also to a second value $C_2$. The light emitter 1 is disconnected from the source of electrical energy 2 when the IMU 3a measures an angle of greater than $C_1$ downward, and reconnected to the source of electrical energy 2 if the IMU 3a measures a downward pitch of less than $C_1$. If the device is further pitched to a downward angle $C_2$ ($C_2 < C_1$), the first logic condition $\theta_1$ may be modified such that the light emitter is reconnected to the source of electrical energy at some intermediate angle $C_1 + \varepsilon$, where $C_2 > C_1 + \varepsilon > C_1$.

In another embodiment of the implementation of step 109, the device may be configured such that the logic conditions 110 ($\theta_1$, $\theta_2$ . . . etc.) are varied depending on the rate of change (time derivative) of the current orientation angle measurement of the IMU 3a. For example, if we assume starting from the illumination status being on and the IMU 3a indicating zero pitch angle, the control circuit 4 may be programmed such that the first logic condition, $\theta_1$ is a comparison of the pitch angle measured by the IMU 3a to a constant value, $C_1$. The light emitter 1 is disconnected from the source of electrical energy 2 when the IMU 3a measures an angle of greater than $C_1$ downward, and reconnected to the source of electrical energy 2 if the IMU 3a measures a downward pitch of less than $C_1$. If the device is further pitched to a downward angle $C_2$($C_2 > C_1$), the first logic condition, $\theta_1$ may be modified such that if the rate of change of the current orientation angle measurement of the IMU 3a (i.e. rotational velocity) exceeds some threshold value, VC, the light emitter 1 is reconnected to the source of electrical energy 2 at some intermediate angle measurement, $C_1 + \varepsilon$, where $C_1 + \varepsilon > C_1$. If the said rotational velocity does not exceed the threshold value VC, the light emitter 1 is reconnected to the source of electrical energy 2 when the angle measurement has a downward pitch less than $C_1$.

In another embodiment of the implementation of step 109, the device will be configured such that the logic conditions 110 ($\theta_1$, $\theta_2$ . . . etc.) are varied depending on the status (pen or closed) of electrical connection between the source of electrical energy 2 and light emitter 1. For example, if we assume starting from the illumination status being on and the IMU 3a indicating pitch angle relative to the ground, the control circuit 4 may be programmed such that the first logic condition, $\theta_1$ is a comparison of the pitch angle measured by the IMU 3a to some constant value $C_1$. The light emitter 1 is disconnected from the source of electrical energy 2 when the IMU 3a measures an angle of $C_1$ downward. Once the light emitter 1 is thus switched off, the logic network 100 modifies the first logic condition, $\theta_1$, such that measured downward angle required to turn the unit back on is $C_2$; $C_2 < C_1$ (i.e. $C_1$ is closer to vertically downward in comparison to $C_2$). Once the device is returned to the on status (either by having a downward pitch angle of less than $C_2$, or by means of some other logic condition), the first logic condition, $\theta_1$ would return to the previous value $C_1$ (the initial state in this example). By this means, the device is turned on at some angle of higher pitch than that which resulted in the device being turned off. If $C_1 = C_2$ in the present example, the light emitter 1 may flicker as the angle is held nearly steady at the angle $C_1$. The flickering described could be due to minor variations in the actual angle the illumination device is held at, or by mechanical inertial effects in the IMU 3a, or small electrical errors in the IMU 3a. If $C_2$ were to be an upward angle in the present example, the device would need to be pitched above horizontal to turn the light emitter back on, which may be desirable in some embodiments.

It is noted that in some cases, the variation of the logic conditions 110 ($\theta_1$, $\theta_2$ . . . etc.) may be dependent upon the status of an electrical control switch 8 comprised of at least two positions. For example, an embodiment of the device may comprise a control switch 8 in the form of a two-way momentary electrical switch, which, when pressed, causes the logic conditions 110 to permit the light emitter 1 to be in the on status over a greater range of angle measurements. In another embodiment, the logic condition(s) may cause the light emitter to be on regardless of orientation for some certain period of time after a control switch 8 is actuated. In yet another embodiment, the logic condition may be altered based on the angle measurement and the press of a button. In this embodiment, the operator will pitch the device to the angle which they desire the light emitter to be turned off or on. While holding the unit in this orientation, a momentary switch is activated. The logic network 100 records this measurement angle as a constant, for example $C_{1a}$. After this event, the light emitter is turned to on status or off status by the logic network 100 and control circuit at the angle $C_{1a}$. In this way, the user gains control over which angle(s) the light emitter is active. Alternatively, this control embodiment may also include the variation of the logic conditions outlined in [0028], in this case the program will modify the logic condition such that the light is changed from on status to off status at $C_{1a}$, and changed from off status to on status at some higher angle (closer to horizontal) $C_{2a}$, where $C_{2a}$ is set at some value $C_{1a}+\varepsilon$, where a is some value as may be appropriate.

It is noted that in the examples preceding, mention is made to measurement of the pitch angle in comparison to the various logic conditions. It is noted that in each case, a similar control scheme is anticipated with respect to the linear acceleration, yaw angle, or roll angle either instead of or in addition to the measured pitch angle. It is further noted that pitch and yaw angles may be inferred or calculated from linear acceleration measurements in a gravitational field. It is also noted that the various control schemes may be used in isolation, or all together in a single embodiment.

It is noted that in the example logic networks 100 given, the form is described consistent with the preferred embodiment using an IMU 3a and programmable microcontroller 4a, with the logic network 100 being comprised of a software program resident within the programmable microcontroller 4a. These are shown by way of example only, without limiting the scope of the present invention. In many instances, other orientation sensors, and other control circuits may be desirous, including using multiple orientation sensors and/or multiple control circuits, and the at least on logic network 100 may take alternative forms (including being multiple, dependent and/or independent logic networks), more appropriate to the manifestation of the specific control circuit(s) and orientation sensor(s) chosen for some particular purpose.

With regards to further embodiments, it is conceived that any and or all of the control circuit 4, the orientation sensor 3, logic conditions 110, and the logic network 100 could be made from any number or combination of purely mechanical systems, or electro-mechanical systems as needed. For example, the orientation sensor 3 could be realized by a mass of electrically conducting fluid, the logic network 100 could be realized by an inclined pathway for the said electrically conducting fluid, and the control circuit 4 could be realized as a pair of electrodes with a gap closed by the electrically conductive fluid. This would meet the object of the present invention: to sense the orientation or acceleration of the device using at least one orientation sensor 3, and illuminate or not illuminate the at least one light emitter 1 depending on the orientation or acceleration by means of a logic network 100 which compares the orientation to some logic conditions 110, and a control circuit 4.

Figure 6:
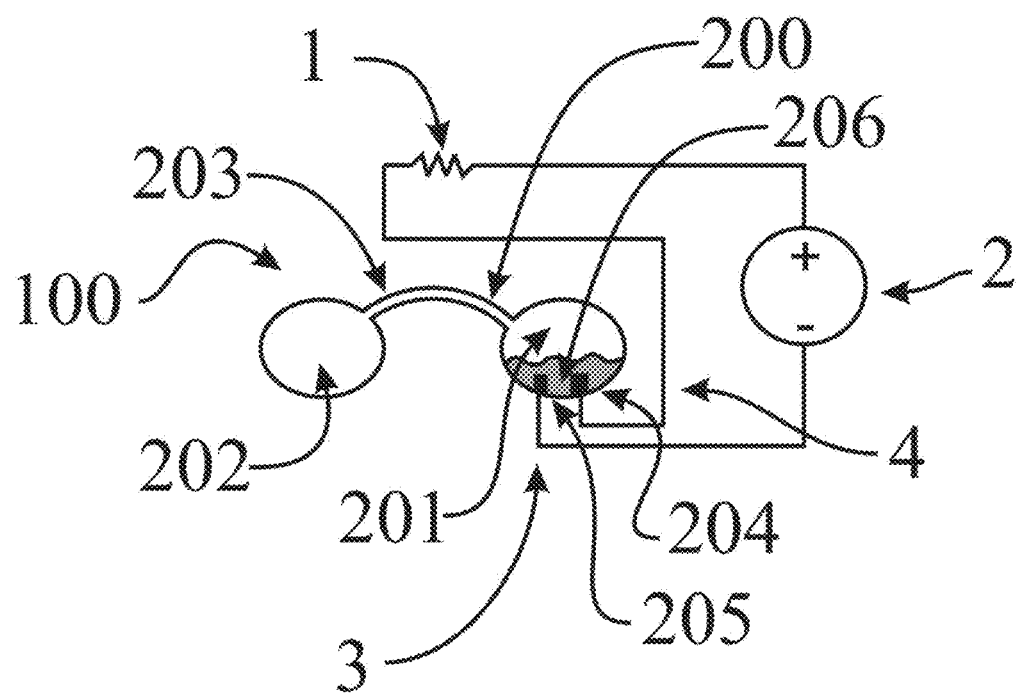
FIG. 6 is a simplified view of an embodiment of the present invention where the orientation sensor, logic network, logic conditions and control circuit are comprised of predominantly mechanical means.

Referring to FIG. 6, the at least one logic network 100 is comprised of a fluid network 200; further comprised of a first reservoir 201, and second reservoir 202; and a passageway 203. The orientation sensor 3 is comprised of an electrically conductive fluid 206. The control circuit 4 is comprised of two electrodes, a first electrode 204, connected to the light emitter, and a second electrode 205, connected to one terminal of the source of electrical energy. The light emitter 1 and source of electrical energy 2 are also shown. The at least one logic conditions 110 are manifested by the physical dimensions and shapes of the fluid network 200. As can be seen in FIG. 6, the light emitter would remain in the on status through some angular displacement in pitch. At some downward pitch angle, the fluid 206 will cease to be in contact with the first electrode 204, thus assigning an off status to the light emitter. If the device is further pitched down, the fluid will travel through the passageway 203 to the second reservoir 202. The device would then have to be pointed at some pitch angle above vertical (in this specific embodiment) to return the fluid through the passageway 203 to the first reservoir 201. In this way the logic conditions have been modified by the angular position of the orientation sensor 3, similar in effect to the microcontroller based embodiment described previously in this specification. It is understood that the pathway shown is an example, but that many such pathways are possible within the context of the present invention.

Figure 7:
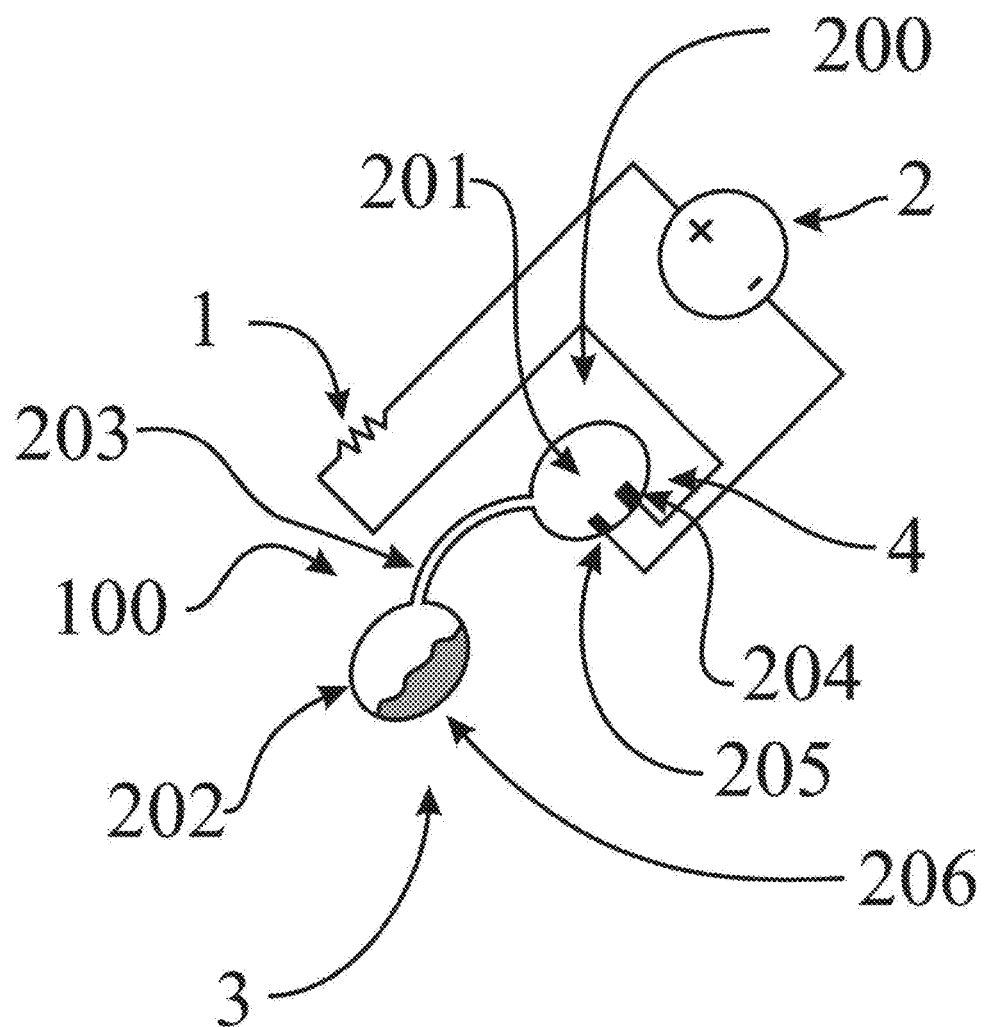
FIG. 7 is a view of the embodiment shown in FIG. 6 which has been pitched downward to allow the device to be in the off status.

Referring to FIG. 7, the embodiment of FIG. 6 is shown in the downward-pitched position. The electrically conductive fluid 206 has traveled through the passageway 203 and thus resides in the second reservoir 202. As can be seen in FIG. 7, the electrodes 204 and 205 are not in electrical contact through the electrically conductive fluid 206 in this position, and thus the light emitter 1 is in the off status.

While the mechanical embodiment shown in FIGS. 6 and 7 is comprised of an electrically conductive fluid 206 and fluid pathways 200, the mechanical and/or electro-mechanical form of the orientation sensor 3 may take any form (and quantity) by which such systems are able to sense orientation; for example, a spring and mass system, a pendulum, a metal ball traveling in a passageway, an opto-mechanical orientation sensor, a potentiometer-based rotation transducer, etc. It is understood that the systems described are examples only, and not meant to limit the scope of the present invention. The control circuit 4 may interact with the orientation sensor 3 in a mechanical fashion, for example in the form of a switch or pair of electrodes, or the mechanical orientation sensor 3 may communicate to an external control circuit 4 through an electro-mechanical system such as a potentiometer, without limiting the present invention. Likewise, the logic network 100 and subsequent logic conditions 110 may be integrated within a mechanical system based on the geometry of the system, as in the example embodiment shown in FIGS. 6 and 7, or may be integrated into a programmable controller, or other scheme as may be desirous. The above stated examples are for illumination purposes only, and are not intended to limit the number or type of orientation sensors, control circuits, logic networks and logic conditions employed for a particular purpose.

Regarding the source of electrical enemy in all embodiments, it is the intent of the present invention to allow for any source of electrical energy, such as AC power supplies, DC batteries, photovoltaic means, thermo-electric sources, fuel cell devices, etc., without limiting the scope of the present invention.

What is claimed is:
1. An illumination device comprising:
  a. At least one light emitter;
  b. at least one source of electrical energy;
  c. at least one orientation sensor, said at least one orientation sensor measuring the orientation angle of the said illumination device relative to the earth, commonly referred to as pitch angle, with vertically upward considered to be +90° pitch, horizontal considered to be 0° pitch, and vertically downward considered to be −90° pitch;
  d. at least one control circuit;

e. at least one logic condition;
f. at least one logic network which compares the said measurement of the at least one acceleration or orientation angle on at least one axis to the said at least one logic condition and which provides for the said at least one control circuit to provide a closed electrical circuit between the said at least one source of electrical energy and said at least one light emitter under certain conditions with respect to the said comparison with the said logic condition resulting in an on status, and instructs the said at least one control circuit to provide an open electrical circuit between the said at least one source of electrical energy and said at least one light emitter under other certain conditions with respect to the said comparison with the said at least one logic condition resulting in an off status;
g. at least one reference pitch angle chosen between +10° and −90°; and
h. the said at least one logic condition making comparison between the said measured pitch angle of the said illumination device and the said at least one reference angle, the said at least one logic network changing the said at least one light emitter to the off status when the said logic condition indicates the said measured pitch angle of the said illumination device is less than the said at least one reference pitch angle, and said at least one logic network changing the said at least one light emitter to the on status when the said logic condition indicates the said measured pitch angle of the said illumination device is greater than the said at least one reference pitch angle resulting in pitch control.

2. An illumination device according to claim 1 where the illumination device includes at least one selector switch, the said at least one selector switch comprising at least two states, where the said at least two states comprise:
a. off state, which renders the said light emitter electrically disconnected from the said at least one source of electrical energy regardless of orientation of the illumination device; and
b. pitch control state, as described in claim 1.

3. An illumination device according to claim 2 where the said at least one selector switch comprises at least three states, where the at least three states include:
a. the said off state;
b. the said pitch control state as described in claim 1; and
c. on state, which renders the light emitter connected to the said at least one source of electrical energy regardless of orientation of the illumination device.

4. An illumination device according to claim 3 where the said at least one selector switch is comprised of two switches, a first switch and second switch; where the said first switch connects and disconnects the said at least one source of electrical energy to the said at least one control circuit and/or said at least one orientation measurement device; and the said second switch changes the state of the illumination device between the said on state and said pitch controlled state.

5. An illumination device according to claim 1 where the said at least one light emitter is comprised of at least two illumination sources, a first illumination source and second illumination source.

6. An illumination device according to claim 5 where the said at least two illumination sources comprise:
a. at least one dispersed, visible spectrum light emitter; and
b. at least one collimated light source, such as a laser.

7. An illumination device according to claim 5, where the said at least one reference pitch angle is comprised of a first reference pitch angle and a second reference pitch angle, where the said first illumination source is placed in on status or off status based on a comparison of the said measured pitch angle with the said first reference pitch angle, and the second illumination source is placed in on status or off status based on a comparison of the said measured pitch angle with the said second reference pitch angle.

8. An illumination device according to claim 1 where the said at least one orientation sensor comprises at least one microelectronic accelerometer and/or gyroscope.

9. An illumination device according to claim 1 where the at least one control circuit comprises at least one programmable microcontroller.

10. An illumination device according to claim 1 where the at least one orientation sensor comprises at least one mechanical angle sensor.

11. An illumination device according to claim 1 where the at least one logic network comprises at least one mechanical logic network.

12. An illumination device according to claim 1 where the said at least one light emitter further comprises additional circuitry to control the output of the said at least one light emitter.

13. An illumination device according to claim 1 further comprising:
a. the at least one reference pitch angle comprised of at least two reference pitch angles, a first reference pitch angle and a second reference pitch angle, where the said first reference pitch angle is selected to be some value between −80° pitch and +10° pitch, and the said second reference angle selected to be some value between the said first reference angle and −90° pitch;
b. the at least one logic condition making comparison between the said measured pitch angle of the said illumination device and the said second reference angle if the at least one light emitter is in on status, the said at least one logic network changing the said at least one light emitter to off status when the said logic condition indicates the said measured pitch angle of the said illumination device is less than the said second reference angle; and
c. the said at least one logic condition making comparison between the said measured pitch angle of the said illumination device and the said first reference angle if the said at least one light emitter is in off status, the at least one logic network changing the light emitter to on status when the logic condition indicates the measured pitch angle is greater than the said first reference angle.

14. An illumination device according to claim 13 further comprising:
a. at least one electrical switch;
b. the at least one logic condition comprised of at least two logic conditions, a first logic condition and second logic condition;
c. said first logic condition operating in the manner described in claim 13;
d. said second logic condition indicating to the at least one logic network to keep the light emitter in on status regardless of orientation; and
e. said at least one logic network choosing between the said first logic condition and the said second logic condition depending upon actuation of the said at least one electrical switch.

* * * * *